United States Patent
Kulkarni et al.

(10) Patent No.: US 11,047,487 B2
(45) Date of Patent: Jun. 29, 2021

(54) METHOD FOR MANUFACTURING A BLOCK FORGED VALVE BODY WITH A FULLY ENCAPSULATED SEAT RING

(71) Applicant: MCC Holdings, Inc., The Woodlands, TX (US)

(72) Inventors: Sudhir K. Kulkarni, Cincinnati, OH (US); Tyler A. Ledgett, San Pedro, CA (US); Sachin S. Chaudhari, Pune (IN); Ranjit N. Bhalkar, Pune (IN)

(73) Assignee: MCC Holdings, Inc., The Woodlands, TX (US)

( * ) Notice: Subject to any disclaimer, the term of this patent is extended or adjusted under 35 U.S.C. 154(b) by 0 days.

(21) Appl. No.: 16/458,704

(22) Filed: Jul. 1, 2019

(65) Prior Publication Data
US 2020/0011432 A1 Jan. 9, 2020

Related U.S. Application Data

(60) Provisional application No. 62/694,247, filed on Jul. 5, 2018.

(51) Int. Cl.
*F16K 3/18* (2006.01)
*F16K 3/314* (2006.01)
*B23P 15/00* (2006.01)

(52) U.S. Cl.
CPC ........... *F16K 3/314* (2013.01); *B23P 15/001* (2013.01); *F16K 3/18* (2013.01)

(58) Field of Classification Search
USPC ....................................... 251/326, 328, 329
See application file for complete search history.

(56) References Cited

U.S. PATENT DOCUMENTS

| | | | |
|---|---|---|---|
| 1,803,889 A * | 5/1931 | Bohnhardt | F16K 3/186 251/176 |
| 1,828,478 A | 10/1931 | Sparks | |
| 2,065,035 A | 12/1936 | Taylor | |
| 3,434,692 A * | 3/1969 | Tillman | F16K 3/316 251/202 |
| 3,486,733 A | 12/1969 | Gordon, Jr. | |
| 4,208,035 A * | 6/1980 | Alvarez | F16K 3/0236 251/196 |
| 4,443,920 A | 4/1984 | Oliver | |
| 4,566,671 A | 1/1986 | Beson | |
| 4,911,407 A | 3/1990 | Paul, Jr. | |

(Continued)

FOREIGN PATENT DOCUMENTS

| | | |
|---|---|---|
| CN | 201306481 Y | 9/2009 |
| CN | 203627856 U | 6/2014 |

(Continued)

OTHER PUBLICATIONS

International Search Report and Written Opinion for PCT Application No. PCT/US2019/040109, dated Sep. 20, 2019, 9 pgs.

(Continued)

*Primary Examiner* — John Fox

(57) ABSTRACT

A block forged valve body includes a fully encapsulated seat ring. The valve body includes a through hole and a chamber having a shelf portion that overlies an annular shoulder that encapsulates the valve seat. Methods for the manufacturing and use thereof are also provided.

23 Claims, 11 Drawing Sheets

(56) References Cited

U.S. PATENT DOCUMENTS

| | | | |
|---|---|---|---|
| 6,401,747 B1 * | 6/2002 | Cain | F16K 3/0254 |
| | | | 137/329.03 |
| 6,969,047 B2 | 11/2005 | Hotton et al. | |
| 8,205,860 B2 | 6/2012 | Song | |
| 8,403,296 B2 | 3/2013 | Phillips | |
| 8,689,996 B2 | 4/2014 | Wolfe et al. | |
| 9,897,215 B2 | 2/2018 | Hunter et al. | |
| 2011/0277985 A1 | 11/2011 | Mosman | |
| 2016/0356399 A1 * | 12/2016 | Shu | F16K 3/0209 |

FOREIGN PATENT DOCUMENTS

| | | |
|---|---|---|
| CN | 206159560 U | 5/2017 |
| CN | 107671221 A | 2/2018 |
| CN | 207715831 U | 8/2018 |

OTHER PUBLICATIONS

International Search Report and Written Opinion for PCT Application No. PCT/US2019/058851, dated Jan. 23, 2020, 14 pgs.

* cited by examiner

Fig. 7A
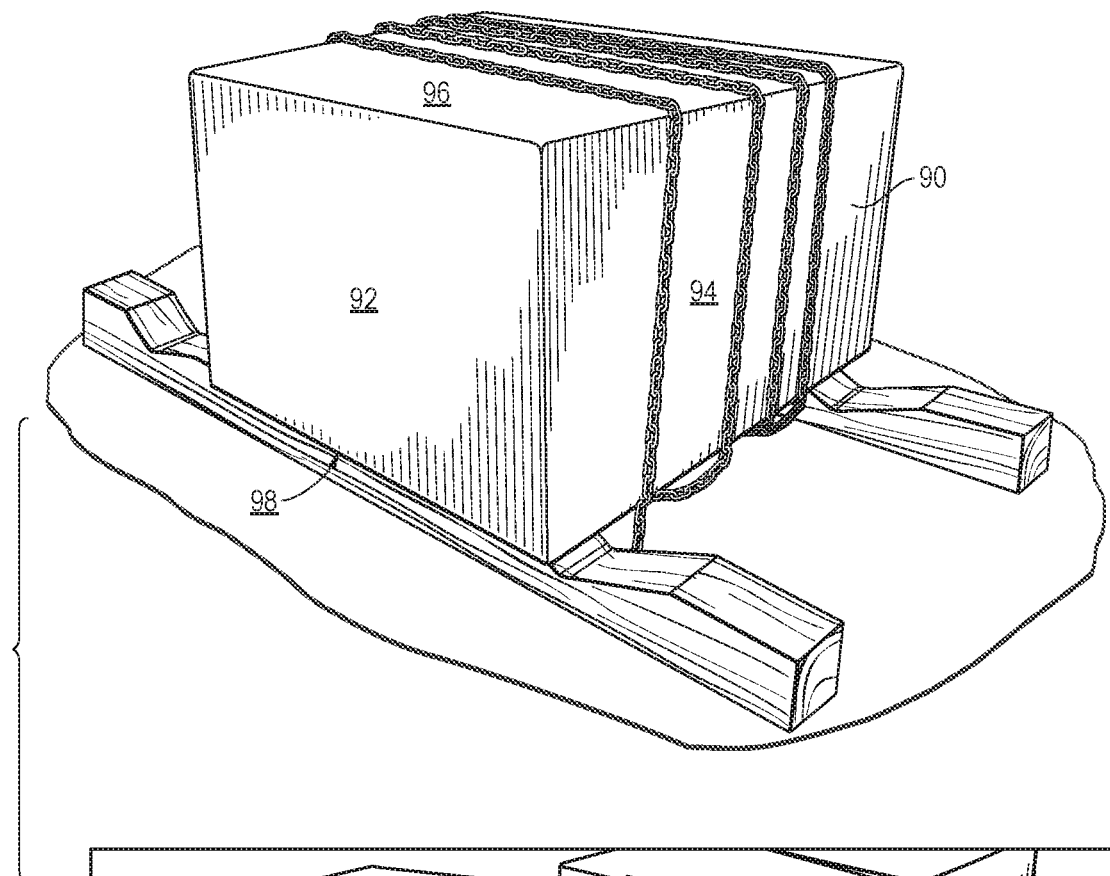
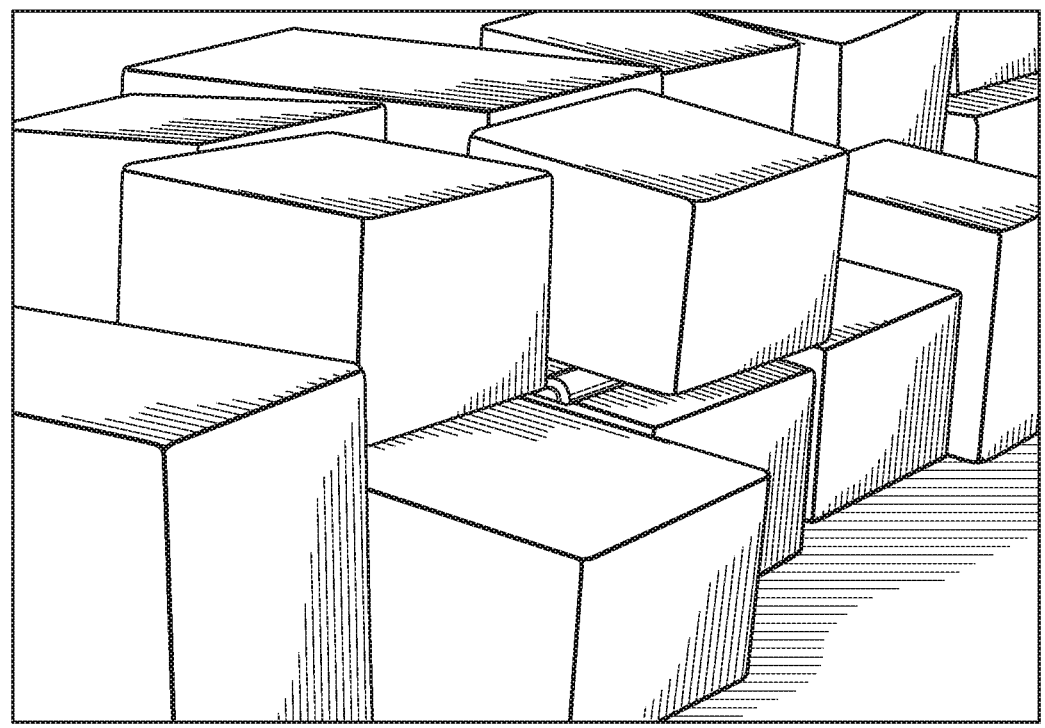

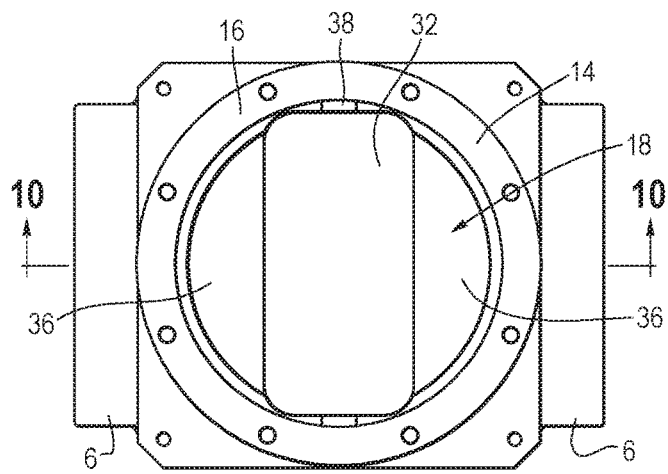
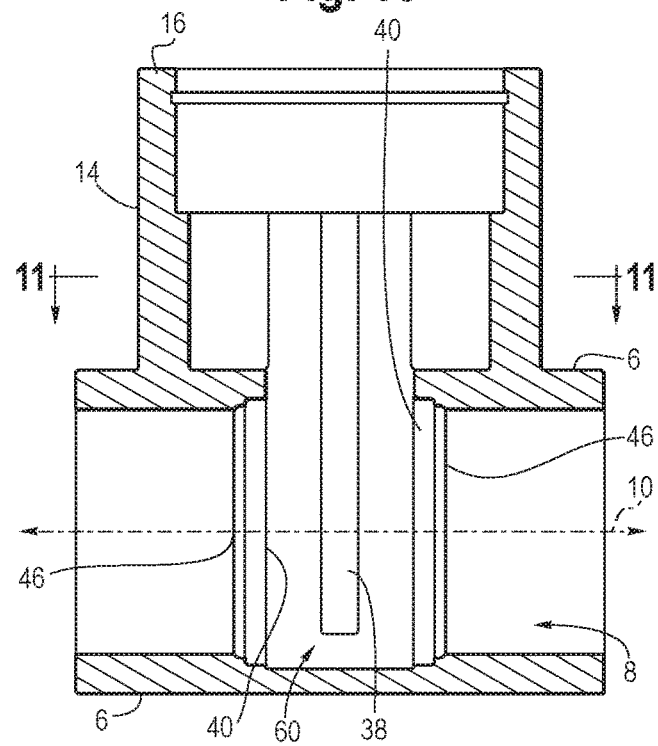
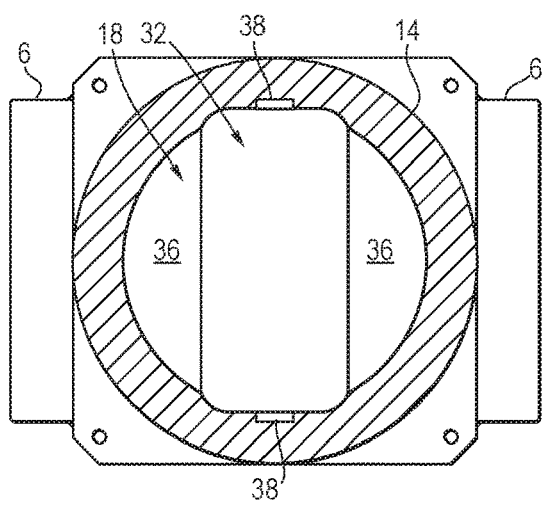

METHOD FOR MANUFACTURING A BLOCK FORGED VALVE BODY WITH A FULLY ENCAPSULATED SEAT RING

CROSS-REFERENCE TO RELATED APPLICATIONS

This application claims the benefit of U.S. Provisional Application No. 62/694,247, filed Jul. 5, 2018, the entire disclosure of which is hereby incorporated herein by reference.

FIELD OF THE INVENTION

The present disclosure relates generally to a valve body, and in particular to a method of manufacturing a block forged valve body having a fully encapsulated seat ring, and to the block forged valve body with a fully encapsulated seat ring and the method for the use thereof.

BACKGROUND

Gate valves typically include a valve body having a flow passageway and gates that slide transversely to open or close the flow passageway. Typically, a pair of valve seats is positioned in the flow passageway to interface with the gates as they move between open and closed positions. In some embodiments, the valve seats are not fully encapsulated around the circumferential periphery thereof, which leads to the valve seat being susceptible to deflection or deformation. Deformation of the valve seat may lead to delamination of the seat ring, for example of a hard seal surface applied thereto, which may contaminate and/or damage the media passing through the valve and equipment located downstream of the valve, or lead to less than optimum sealing of the valve.

In some applications, the valve body may be made from a casting or die forging, which allows for the formation and definition of various features. Casting and die forging require expensive and unique molds and dies, which are not easily reconfigured. As such, the casting and die forging processes do not lend themselves to easily reconfiguring the shape and function of the valve body, for example if a larger gate and/or through opening is required.

In other applications, the valve body may be configured by connecting a plurality of separate parts, for example coupling top, middle and bottom portions, or side portions, with mechanical fasteners. These types of valve bodies, however, require additional fasteners and sealing interfaces, and are more susceptible to leakage, for example over time, than a one-piece valve body.

For these reasons, the need remains for a one-piece valve body that provides for full encapsulation of the valve seats, while also allowing for easy reconfiguration of the different passageways and openings to accommodate different valve mechanisms.

SUMMARY

The present invention is defined by the following claims, and nothing in this section should be considered to be a limitation on those claims.

In one aspect, one embodiment of a method of manufacturing a valve body includes block forging a one-piece body having opposite ends, opposite sides, a top and a bottom. The method further includes machining a through hole, which has a first minimum diameter and extends along a first axis, between the opposite ends. The through hole defines a flow passageway. The method also includes machining a chamber, which has a second minimum diameter and extends from the top along a second axis orthogonal to the first axis. The chamber includes a bottom defined by a floor, which separates the chamber from the through hole. The method further includes machining a passageway through the floor between the chamber and the through hole and thereby defining a pair of semi-circular shelf portions overlying the through hole, and machining an annular shoulder, which has a third diameter and extends along the first axis under each of the shelf portions. Each of the annular shoulders has a first depth defined under the shelf portion along the first axis, and are coaxial with the through opening. The method further includes inserting a valve seat in each of the annular shoulders, wherein each of the valve seats has a circumferential surface having a second depth. The second depth is between 125 and 135% of the first depth. An entirety of the first depth is in contact with the circumferential surface of a corresponding valve seat. The valve seats each have a front side facing each other and a backside facing away from each other.

In another aspect, a method of manufacturing a valve further includes inserting a valve stem in the chamber along the second axis, wherein a pair of spring loaded discs is coupled to the end of the valve stem. The discs are moveable along the second axis from a closed position, wherein the discs are disposed in the through hole in engagement with the valve seats, to an open position, wherein the discs are disposed at least partially in the chamber such that the through channel is not blocked by the discs.

In another aspect, one embodiment of a valve body includes a one piece block forged body having opposite ends, opposite sides, a top and a bottom. The block forged body further includes a through hole, which has a first minimum diameter and extends along a first axis between the opposite ends. The through hole defines a flow passageway. A chamber has a second minimum diameter and extends from the top along a second axis orthogonal to the first axis. The chamber includes a bottom defined by a floor separating the chamber from the through hole. A passageway extends through the floor between the chamber and the through hole. The floor comprises a pair of semi-circular shelf portions overlying the through hole. An annular shoulder has a third diameter and extends along the first axis under each of the shelf portions. The annular shoulder has a first depth defined under the shelf portion along the first axis. The annular shoulders are coaxial with the through opening. A valve seat is disposed in each of the annular shoulders. Each of the valve seats has a second depth, wherein the second depth is at least greater than 100%, and preferably between 125 and 135%, of the first depth. The valve seats each have a front side facing each other and a backside facing away from each other.

In yet another aspect, one embodiment of a valve includes a valve stem disposed in the chamber and extending along the second axis. A pair of spring loaded discs is coupled to the end of the valve stem. The discs are moveable along the second axis from a closed position, wherein the discs are disposed in the through hole in engagement with the valve seats, to an open position, wherein the discs are disposed at least partially in the chamber such that the through channel is not blocked by the discs.

The various embodiments of the valve body and valve, methods of manufacturing the valve body and valve, and the methods for the use thereof, provide significant advantages over other valve bodies, valves and methods of manufacture and use. For example and without limitation, the disclosed valve body and method of manufacture allow for the use of a one-piece valve body, which avoids the need for fasteners and sealing interfaces, and thereby ensures the integrity of the valve body. At the same time, by using a block forged body, the various subsequent machining operations may be easily altered or modified to accommodate differently sized internal valve components, such as the valve gates and stem. In addition, the forging and machining operations provides for a pair of shelves, which ensure that the valve seats are fully encapsulated around the entire circumference thereof, and therefor extends the life of the valve by avoiding deformation and/or delamination of the valve seats.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 7A is a perspective view of a block forged body.

FIG. 9 is a top view of valve body shown in FIG. 8 after additional machining.

FIG. 10 is a vertical cross-sectional view of the valve body taken along line 10-10 of FIG. 9.

FIG. 11 is a horizontal cross-sectional view of the valve body taken along line 11-11 of FIG. 10.

DETAILED DESCRIPTION OF THE PRESENTLY PREFERRED EMBODIMENTS

Figure 1:
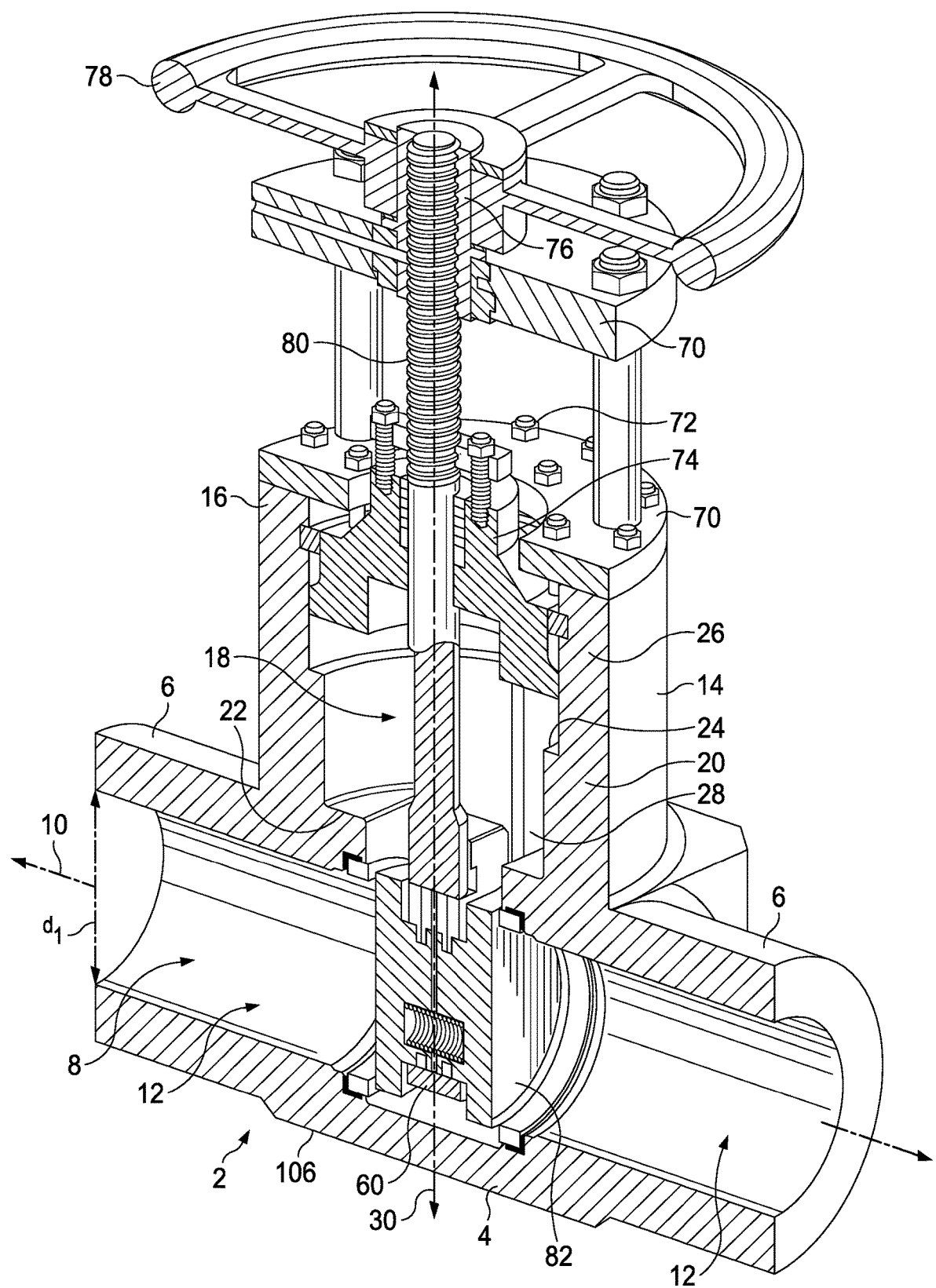
FIG. 1 is a perspective cross-sectional view of a parallel disc gate valve.
Figure 2:
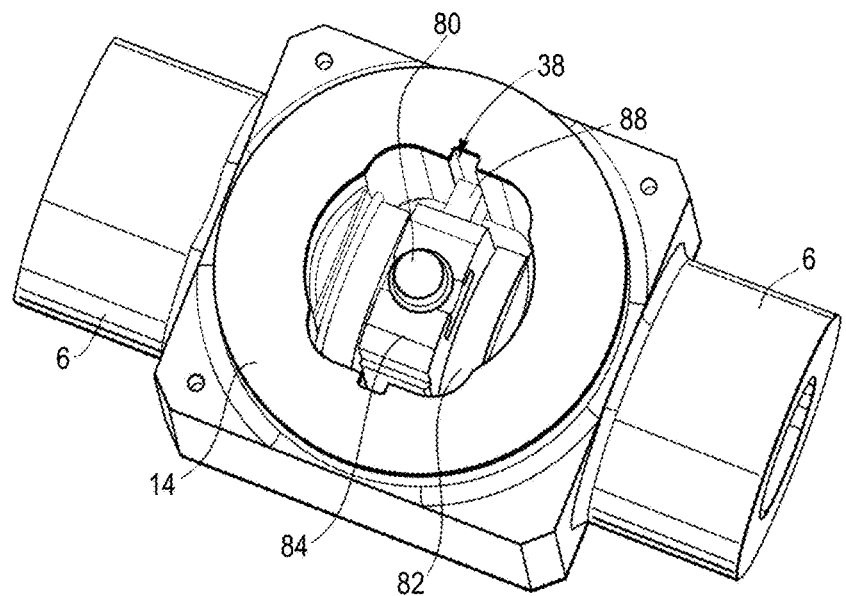
FIG. 2 is a top perspective view of one embodiment of the disc gate valve shown in FIG. 1.
Figure 3:
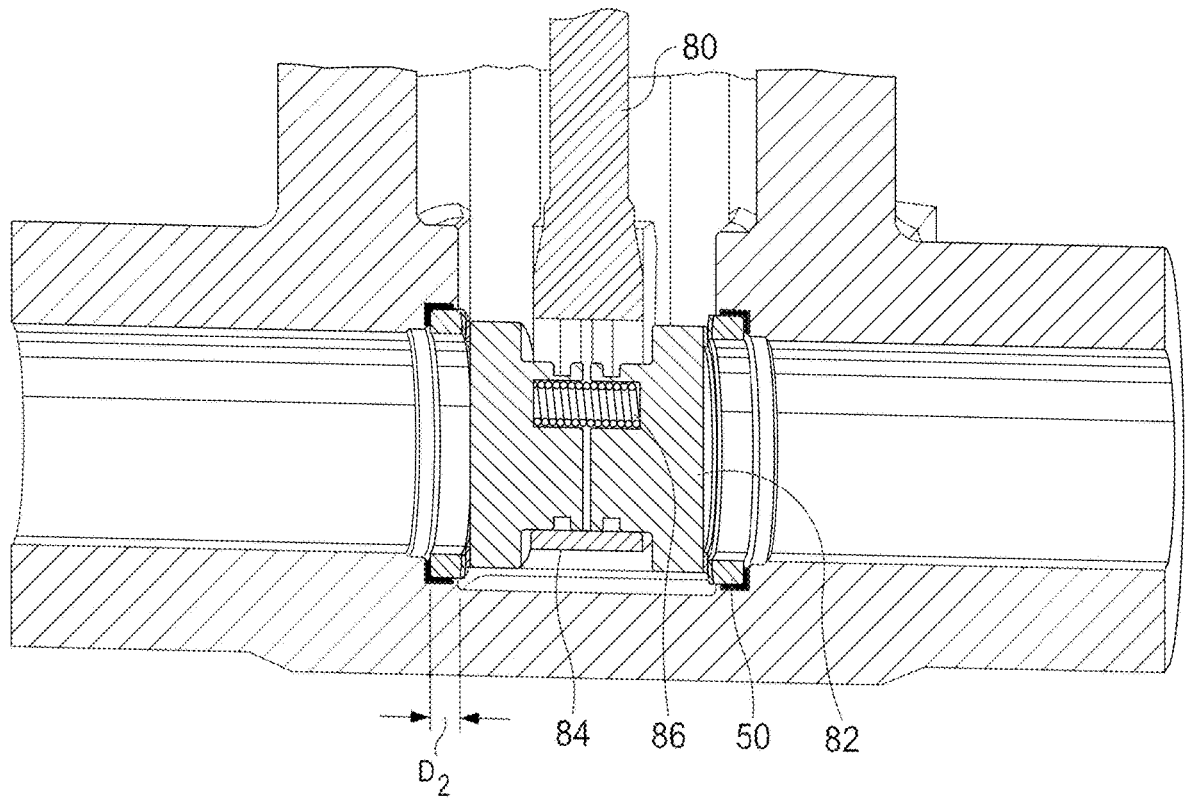
FIG. 3 is a cross-sectional view of a lower portion of the valve assembly.
Figure 4:
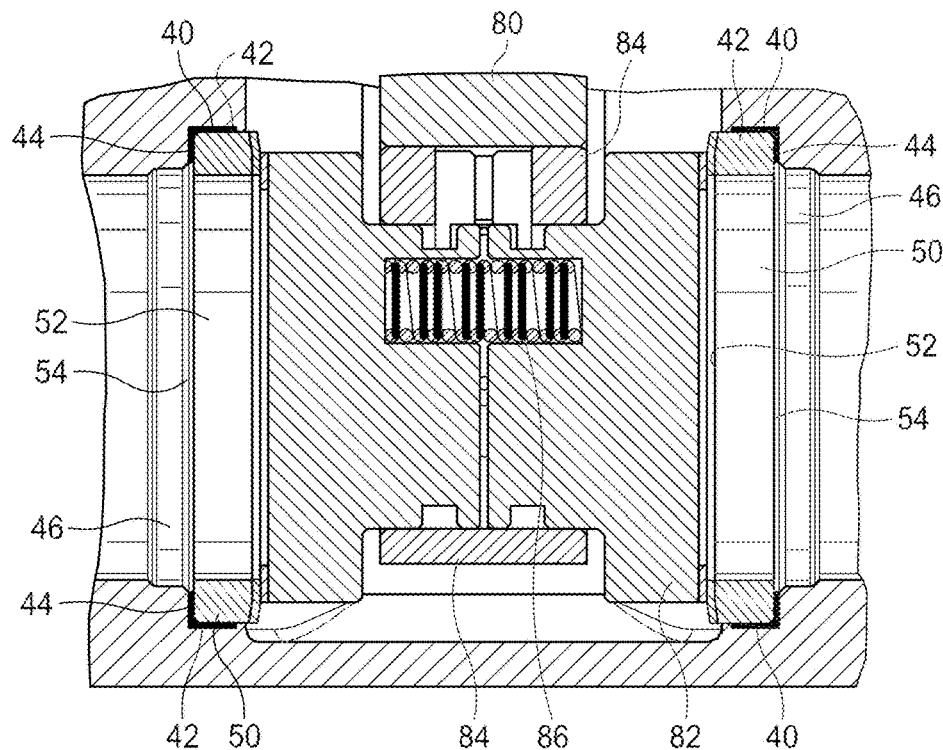
FIG. 4 is an enlarged vertical cross-sectional view of the valve seat and gates shown in FIG. 3.
Figure 5:
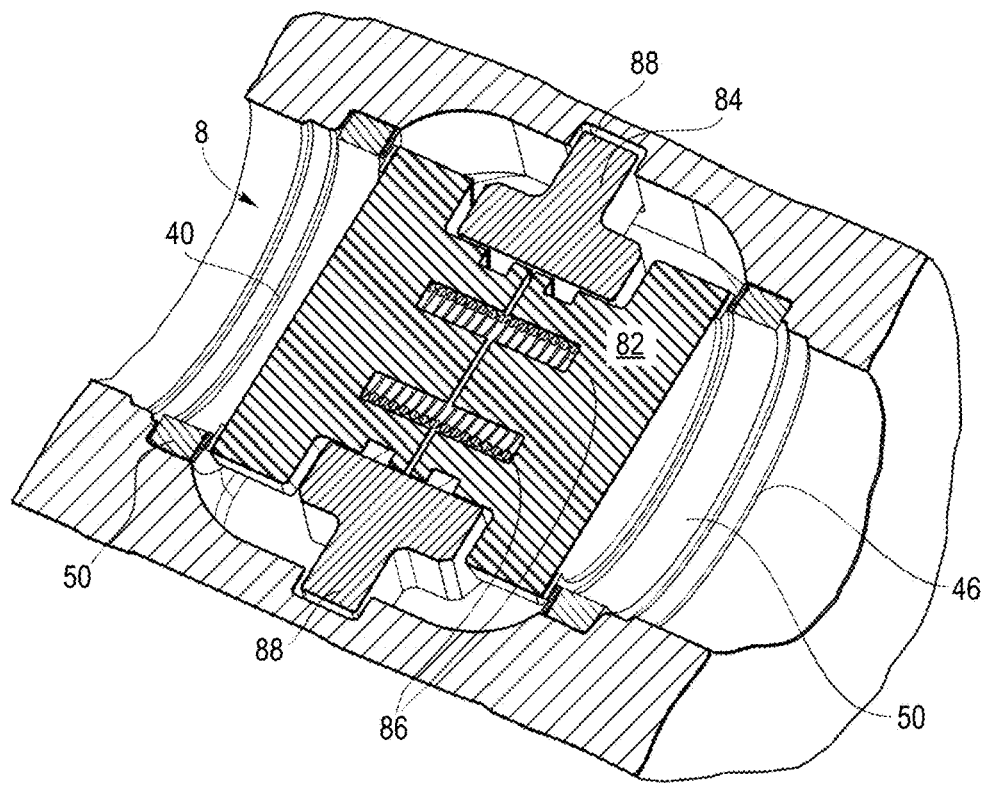
FIG. 5 is an enlarged horizontal cross-sectional view of the valve seat and gates.

It should be understood that the term "plurality," as used herein, means two or more. The terms "outboard" and "inboard" refer to the relative position of different features relative to a common axis or plane. The term "coupled" means connected to or engaged with, whether directly or indirectly, for example with an intervening member, and does not require the engagement to be fixed or permanent, although it may be fixed or permanent (or integral). The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. For example, a "first" diameter may be later referred to as a "second" diameter depending on the order in which they are referred. It should also be understood that designation of "first" and "second" does not necessarily mean that the two components or values so designated are different, meaning for example a first diameter may be the same as a second diameter, with each simply being applicable to separate components. The terms "vertical" and "horizontal" refer to the orientation of various components as shown in the drawings, but with the understanding that those components may be rotated and used in other orientations.

Figure 6:
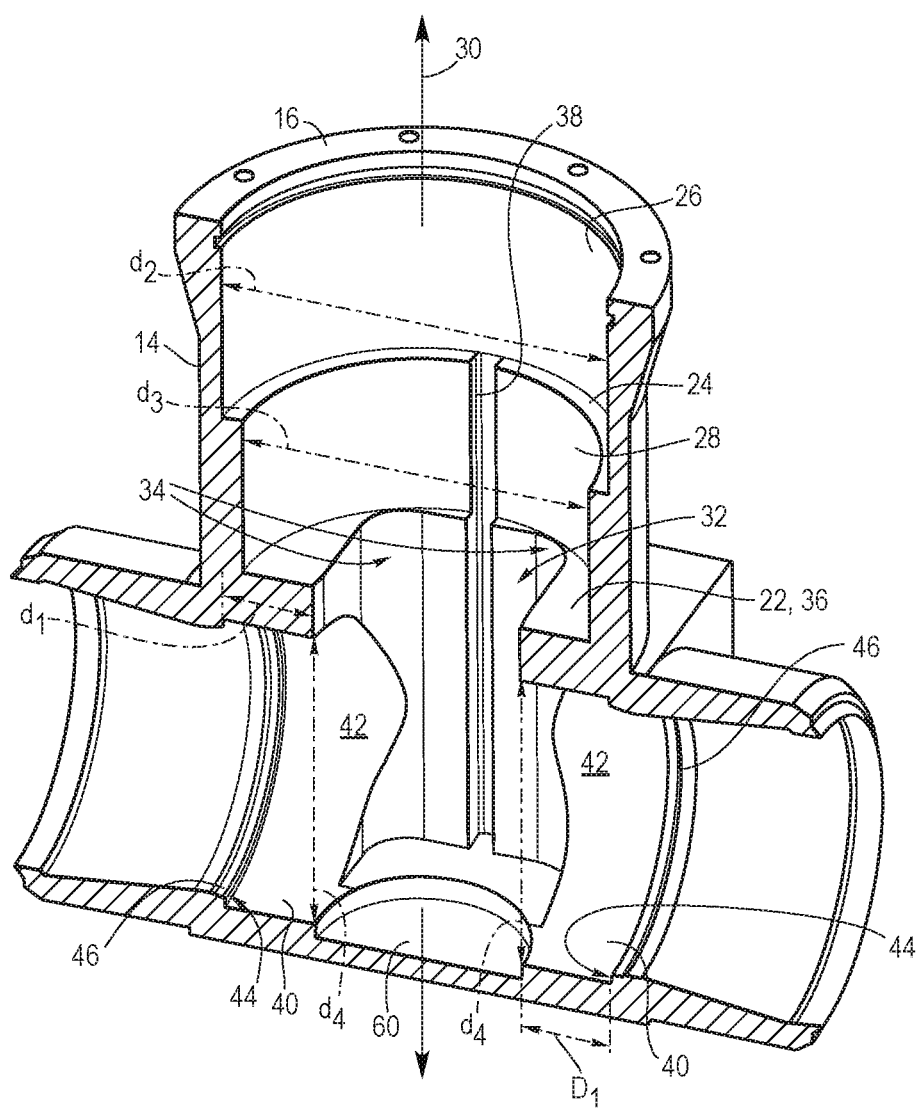
FIG. 6 is a vertical cross-sectional view of the valve body without the valve seats installed.

Valve Body:

Referring to FIGS. 1 and 6, a gate valve 2 is shown as including a one-piece valve body having an inverted T-shape, with a pair of cylindrical end portions 6 defining an interior flow passageway 8 that extends along a longitudinal axis 10 between opposite ends of the body. The end portions each have an interior passageway 12, which may be cylindrical or tapered with a varying diameter, defined by a minimum diameter (d1), for example and without limitation 7.76 inches to 24.63 inches, of the flow passageway 8.

A cylindrical neck portion 14 extends upwardly from the end portions. The neck portion includes an annular flange or top surface 16 defining a top of the body. The neck portion defines an interior chamber 18 having a circumferential side wall 20, a bottom defined by a floor 22 and an open top. The side wall includes a step 24 defining upper and lower portions 26, 28 of the chamber, each with a diameter d2 (e.g., 13.3 inches to 32.5 inches), d3 (e.g., 12.62 inches to 30.25 inches). The chamber extends downwardly into the neck portion from the top along a longitudinal axis 30 that extends transverse to the longitudinal axis. In one embodiment, the axes 10, 30 are orthogonal or perpendicular. It should be understood that the chamber may have a cross-sectional shape other than a circle, including for example and without limitation various polygonal shapes, or other elliptical shapes.

A passageway 32 extends through the floor between the chamber 28 and the flow passageway 8. In one embodiment, the passageway has a rectangular shape, with rounded corners 34 as shown in FIGS. 2, 5, 6 and 11, and extends down through the flow passageway 8 as shown in FIG. 6 to form a lower chamber defining in part the flow passageway. The rectangular shape is dimensioned and accommodates the movement of a carriage and disc components of the valve through the passageway as further disclosed herein. In one embodiment, the width of the passageway is slightly greater than the diameter of the chamber, such that channels are formed on opposite sides of the wall. Alternatively, the corners 34 may be tangent with the surface of the chamber, or be positioned radially inwardly from the surface. A pair of longitudinal grooves 38 extends along opposite sides of the chamber 18, passageway 32 and lower chamber as shown in FIG. 6 in a direction of the longitudinal axis 30. Due to the difference in the shapes of the passageway 32 and chamber, a portion of the floor includes a pair of spaced apart shelf portions 36, each having a semi-circular shape in the embodiment configured with a circular cross section for the chamber and a rectangular cross section for the passageway. In other embodiments, the shelves may have other shapes depending on the mutual shapes and intersection of the chamber and passageway.

An annular shoulder 40 extends along the longitudinal axis circumferentially around the flow passageway 8 beneath each of the shelf portions 36. The annular shoulder has a circumferential surface 42 and a rear surface 44 defining a corner. The circumferential surface portion of the annular shoulder has a minimum diameter d4 that is greater than the minimum diameter of the flow passageway, and a depth D1 (e.g., 1.2 inches to 8.37 inches), otherwise referred to as a width. The annular shoulder is coaxial with the flow passageway 8 along axis 10.

A pair of annular valve seats 50 are disposed in the annular shoulders 40. In one embodiment, the valve seats are made of SA 182 F91/SA 335 P91. The valve seats each have a front side 52 facing each other and a backside 54 facing the away from each other. The backside 54 is engaged with a rear wall of a respective annular shoulder 40. The valve seats each have a circumferential surface 56 having a second depth D2, otherwise referred to as a width. The depth D2 is greater than the depth D1, or more than 100% of the depth D1 such that engagement of each valve seat 40 by a corresponding valve disc 82 is ensured as further explained below, and preferably the depth D2 is between 125% and 135% of the depth D1, including for example a 0.4 inch overhang across the range. The entirety of the circumferential surface 42 having depth D1 is in contact with the circumferential surface 56 of a corresponding valve seat, while in other embodiments at least 75% of the circumferential surface is in contact. It should be understood that the valve seat is axially fixed relative to the annular shoulder.

A second annular shoulder 46, which may be formed as a groove, is formed in each of the end portions outboard of the first annular shoulder relative to the longitudinal axis 30. The second annular shoulder 46 has a minimum diameter (e.g., 8.41 to 24.88 inches), extends along the longitudinal axis 10 and is coaxial with the first annular shoulder 40 and the flow passageway 8. The diameter of the second annular shoulder is less than the diameter of the first annular shoulder, and greater than the minimum diameter of the flow channel.

A cavity 60 is formed at the bottom of the passageway 32 beneath the flow passageway 8 in horizontal alignment with the overlying chamber along the longitudinal axis 30.

The valve seat 50 is welded to the end portions of the body at the second annular shoulder or groove 46, which abuts the backside of the valve seats. As shown in FIGS. 1 and 3-5, the valve seat 50 is encapsulated by the valve body, and in particular the annular shoulder 40, meaning that at least 75% of the depth D2 of the valve seat is surrounded by the valve body around the entire circumference of the valve seat. As mentioned, the valve seat may be made of SA 182 F91/SA 335 P91, and may include a hard sealing surface, or hardfacing, on the front side thereof, including for example and without limitation a Stellite® hardfacing.

Valve Components

Referring to FIGS. 1-5, a bonnet 70 is secured to the top of the valve body with a plurality of fasteners 72 to close the open top of the chamber 18. A pressure seal 74 is disposed in the chamber below the bonnet and is coupled thereto, while a yoke 76 is coupled to and extends upwardly from the top of the bonnet and supports a valve stem 80. In one embodiment, the valve stem 80 is a rising stem, which is threadably engaged by an actuator 78, shown as a wheel.

A pair of discs 82 are coupled to a distal end of the stem with a carriage 84, which includes guides 88 that slide along the grooves in the chamber. A plurality of (shown as two) compression springs 86 are disposed between the discs, and bias the discs outwardly away from each other. The discs 86 are biased into engagement with the valve seats 50 when the valve is in a closed position, or with the discs disposed in the flow passageway to stop flow therethrough. A portion of the carriage 84 may be disposed, or received, in the cavity 60 when the valve is in the closed position.

In operation, the stem 80 may be rotated by the actuator 78, causing the stem 80, discs 82 and carriage 84 to move upwardly from the flow passageway 8 through the passageway 32 in the floor and into the chamber 18, whereinafter the discs are in an open position such that the flow passageway 8 is not blocked by the discs. The discs 82 may be parallel or arranged at an angle relative to each other in a wedge configuration. To close the flow passageway 8, the actuator 78 is rotated in the opposite direction, causing the discs to move downwardly into the flow passageway 8 and engage the valve seats 50.

Manufacture of the Valve Body

Figure 7B:
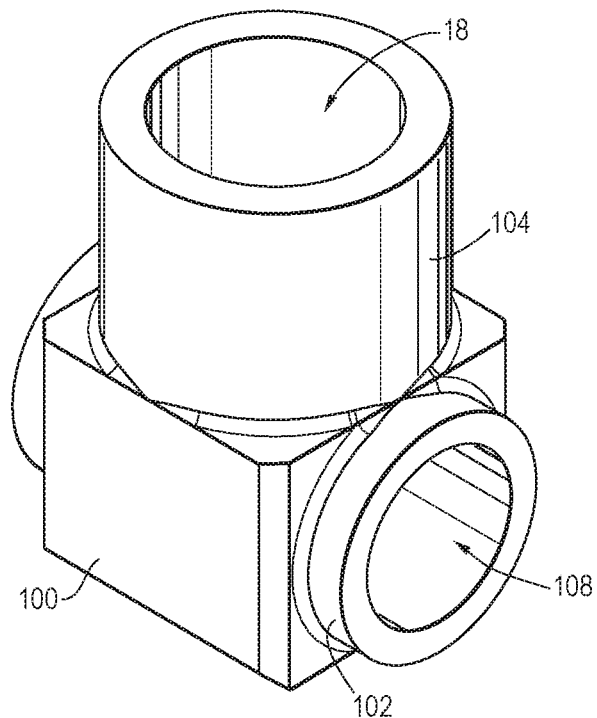
FIG. 7B is a perspective view of the valve body after machining of the portions of the interior and exterior thereof.
Figure 8:
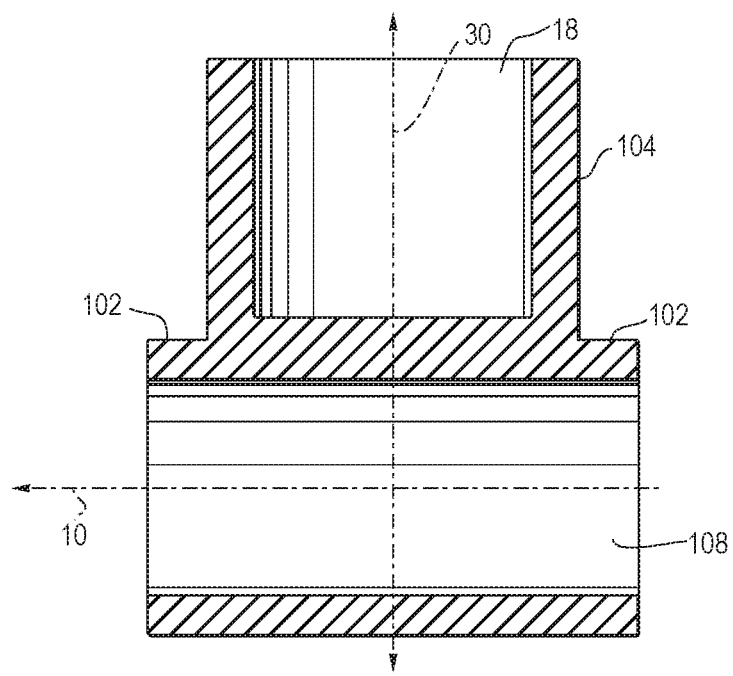
FIG. 8 is a vertical cross-sectional view of the valve body shown in FIG. 7B.
Figure 12A:
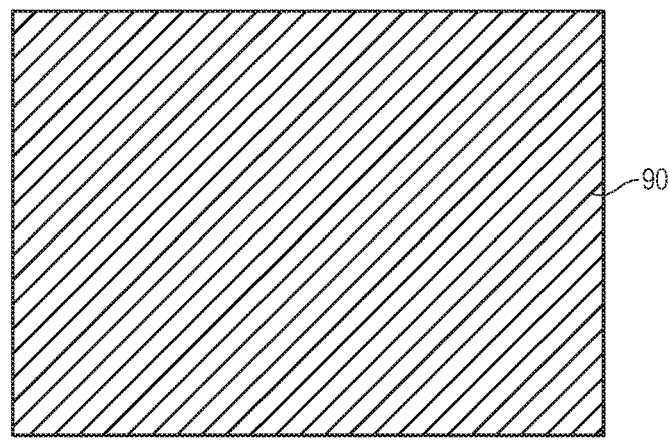
FIGS. 12A-K show a process flow for a block forged valve body.
Figure 12B:
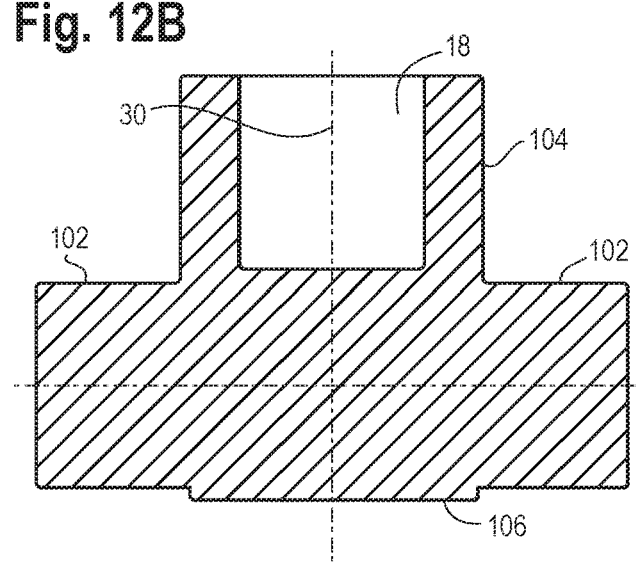
Figure 12C:
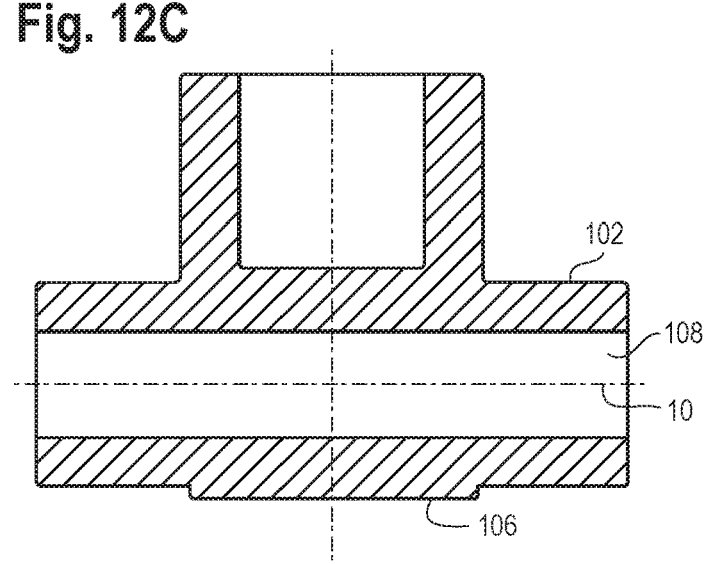
Figure 12D:
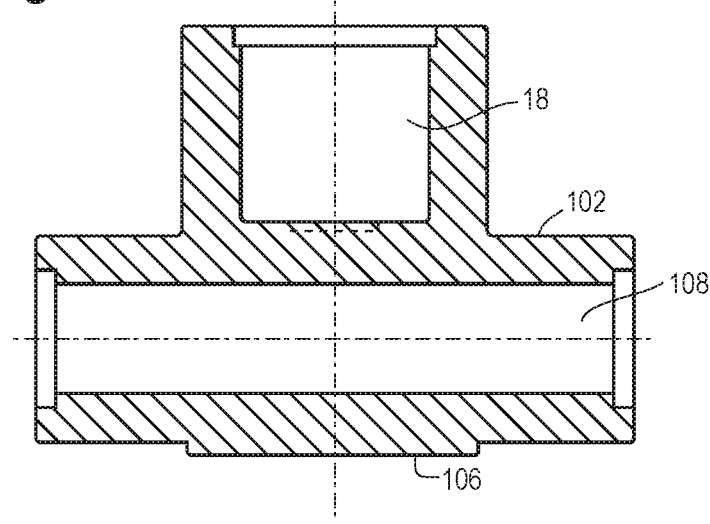

Referring to FIGS. 7A-12K, a one-piece body is formed by block (hot) forging a block 90 of ASTM A182 Grade F91 Alloy Steel, which has opposite ends 92, opposite sides 94, a top 96 and a bottom 98 (see FIGS. 7A and 12A). For example, and without limitation, the length may be from 33 inches to 56 inches, the width from 20 inches to 40 inches and the height from 30 inches to 64 inches. Rough machining may be performed to shape the outside surface of the end portions and head portion, defining a generally inverted T-shape, with a central block, having a rectangular prism 100 shape that which may be a cube in one embodiment, cylindrical end portions 102 extending from opposite ends of the prism, and a cylindrical neck portion 104 extending upwardly from the top of the prism. The prism provides increased strength and thickness, while also providing a flat bottom surface 106 for ease of mounting and locating of the valve body (see FIG. 12B). The term "machining" refers to any of various processes in which a piece of raw material is reconfigured into a desired final shape and size by a controlled material-removal process, for example with the use of machine tools. The three principal machining processes are turning, drilling and milling. Other operations include shaping, planing, boring, broaching and sawing. Computer numerical control (CNC) machines may be used, for example a vertical turning latch (VTL) may be used to pre-machine the neck and flow bore/passageway as shown in FIGS. 12B and C.

Figure 12E:
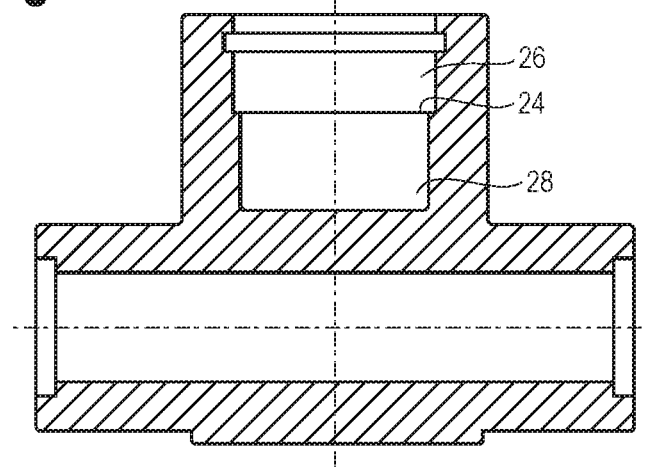
Figure 12F:
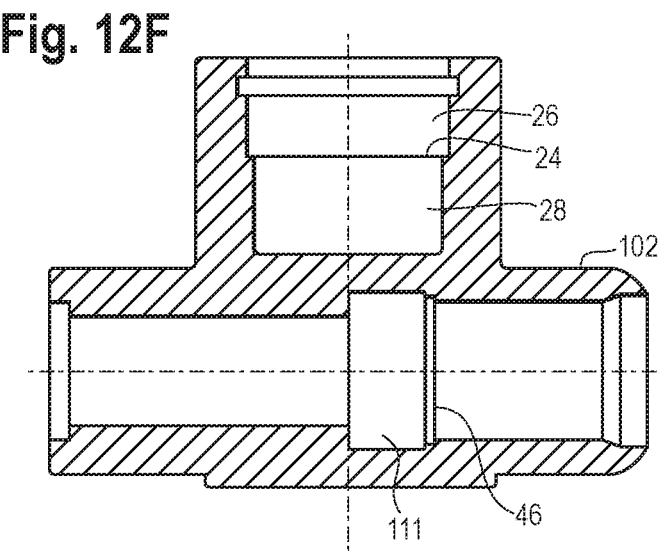
Figure 12G:
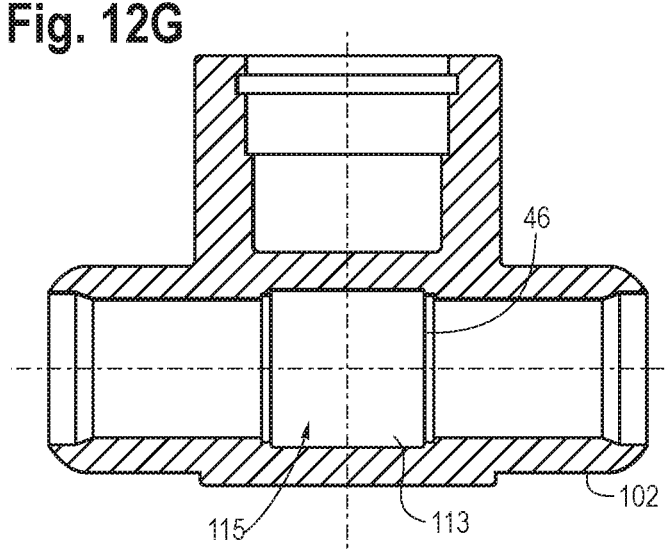

As shown in FIGS. 7B, 8, 12B and 12C, a through hole or flow bore 108 is machined (e.g., using VTL) along the first longitudinal axis 10 between the opposite ends to define the flow passageway. The through hole may be cylindrical, or have a tapered, frusto-conical shape with a minimum diameter as disclosed herein. Multiple machining operations may be performed to configure the chamber 18 with different upper and lower portions. Before, or after machining of the through-hole, the process includes machining (e.g., VTL) the chamber 18 from the top 96 of the body along the longitudinal axis 30. Multiple machining operations may be performed to configure the chamber with different upper and lower portions as disclosed herein, as shown in FIGS. 12D-H. For example, the flow bore 108 and chamber 18 are used as references for further machining, using for example a horizontal machining center (HMC). The configuration of the chamber 18 on the top side is further refined using a CNC lathe as shown in FIG. 12E. A CNC lathe is also used to machine the final configuration of the through hole 108 as shown in FIGS. 12 F and G, finishing the upstream and downstream ends.

Figure 12H:
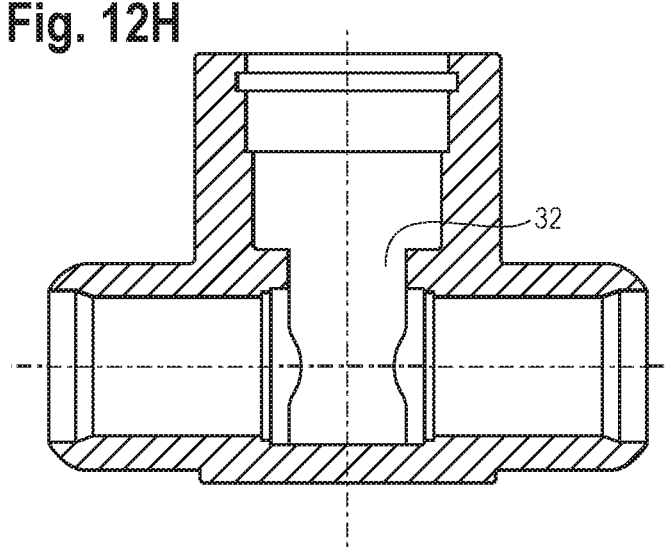
Figure 12I:
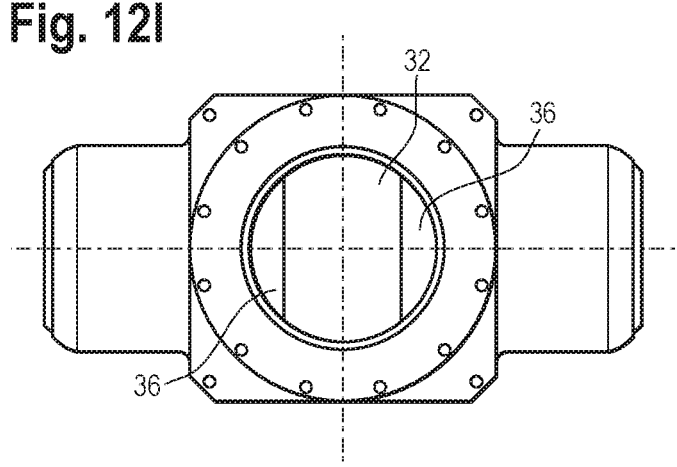
Figure 12J:
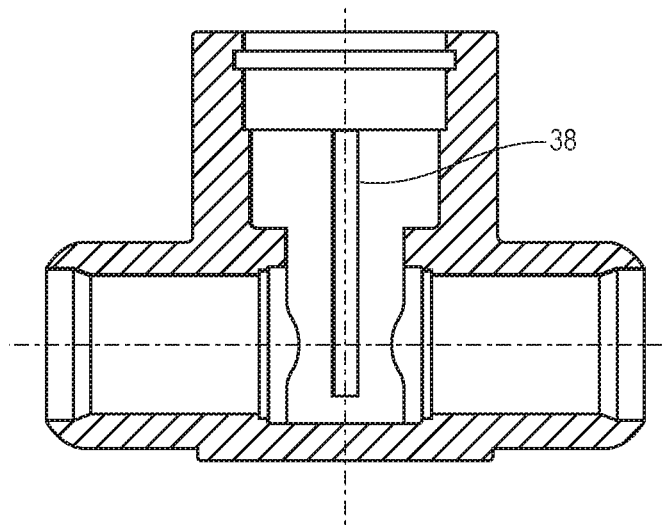

Referring to FIG. 12H, the process further includes machining the passageway 32, for example using rectangular pocket milling through the floor between the chamber and the through hole 108, and further down through the through hole which may occur before or after one or both of the machining of the through hole and chamber. The machining may further include machining the cavity 60 in the bottom of the body below the flow passageway as the passageway 32 is machined. The machining of the passageway 32, or of the chamber, forms the shelf portions 36. The channels and grooves 38 are also machined into the chamber, the passageway 32 and lower chamber and the flow passageway, as shown in FIG. 12J, for example using a milling process.

Figure 12K:
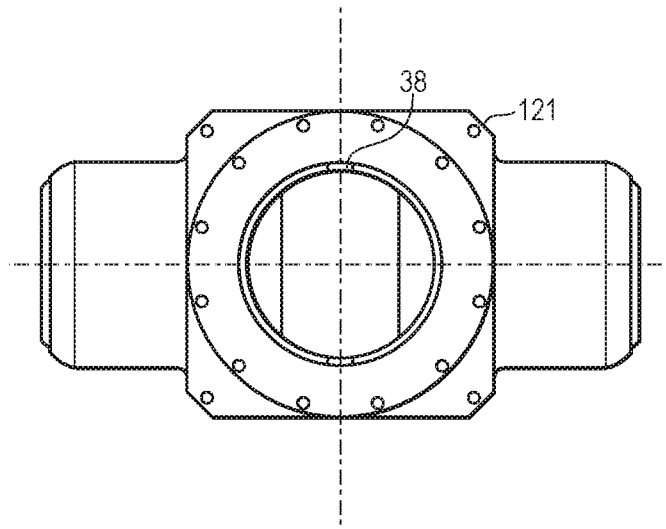

The process further includes machining (see FIGS. 12G and H) the first annular shoulders 40 under the spaced apart shelf portions 36, and machining the second annular shoulders or grooves 46 outboard of the first annular shoulders, again in either sequence. The first shoulders may be formed by the machining of the passage way 32 into the central cylindrical cavity 115 formed by the upstream and downstream operations defining upstream and downstream 111, 113 portions thereof. Top face holes may be formed by drilling as shown in FIG. 12I. The outside corners of the prism block 100 may be chamfered as shown in FIG. 12K, for example using HMC. The overall outer surface may then be deburred, for example using a grinder.

The process includes inserting a valve seat 50 into each of the annular shoulders, which fully encapsulate the valve seats, and with the entirety of the depth D1 of the circumferential surface 42 being in contact with a respective valve seat. The valve seats are then connected to the body by welding the backside of the valve seat to the body, and in particular by welding the valve seat to the body along the second annular shoulder.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A method of manufacturing a valve body comprising:
   block forging a one-piece body having opposite ends, opposite sides, a top and a bottom;
   machining a through hole having a first minimum diameter and extending along a first axis between the opposite ends, wherein the through hole defines a flow passageway;
   machining a chamber having a second minimum diameter and extending downwardly from the top along a second axis, wherein the first and second axes are orthogonal, and wherein the chamber comprises a bottom defined by a floor separating the chamber from the through hole;
   machining a passageway through the floor between the chamber and the through hole and thereby defining a pair of shelf portions overlying the through hole;
   machining a first pair of annular shoulders, each annular shoulder of the first pair of annular shoulders having a third minimum diameter greater than the first minimum diameter and extending along the first axis under each of the shelf portions, wherein each annular shoulder of the first pair of annular shoulders has a first depth defined under the shelf portion along the first axis, and wherein the first pair of annular shoulders is coaxial with the through hole; and
   inserting a valve seat in each annular shoulder of the first pair of annular shoulders, wherein each of the valve seats has a circumferential surface having a second depth, wherein the second depth is between 100 and 135% of the first depth, and wherein the valve seats each have a front side facing each other and a backside facing away from each other; and
   securing each valve seat in a respective shoulder of each annular shoulder of the first pair of annular shoulders such that the valve seat is not moveable along the first axis, and the backside of each valve seat is fixed to at least part of one annular shoulder of the first pair of annular shoulders.

2. The method of claim 1, wherein block forging the one-piece body comprises block forging a rectangular prism.

3. The method of claim 1, wherein securing each valve seat in the respective shoulder of each annular shoulder of the first pair of annular shoulders further comprises welding the back side of each valve seat to the respective shoulder of each annular shoulder of the first pair of annular shoulders.

4. The method of claim 1, further comprising:
   machining a second pair of annular shoulders, wherein each annular shoulder of the second pair of annular shoulders is outboard of each of the first pair of annular shoulders, wherein each annular shoulder of the second pair of annular shoulders has a fourth minimum diameter and extends along the first axis, wherein the first and second pairs of annular shoulders are coaxial and wherein the fourth minimum diameter is less than the third minimum diameter, and
   wherein the welding comprises welding the valve seats to the valve body along the first pair of annular shoulders and the second pair of second annular shoulders.

5. The method of claim 1, wherein the shelf portions have a semi-circular shape.

6. The method of claim 5, wherein the passageway has a rectangular shape.

7. The method of claim 6, wherein the rectangular shape has rounded corners.

8. The method of claim 1, wherein the front side of each of the valve seats comprises a hard sealing surface.

9. The method of claim 1, further comprising machining a cavity in alignment with the passageway and chamber along the second axis on an opposite side of the through hole.

10. The method of claim 1, further comprising changing a dimension of one or more of the first, second or third minimum diameters or the passageway.

11. A method of manufacturing a valve comprising the steps of claim 1, and further comprising inserting a valve stem in the chamber along the second axis, wherein a pair of spring loaded discs is coupled to an end of the valve stem, wherein the pair of spring loaded discs are moveable along the second axis from a closed position, wherein the pair of spring loaded discs are disposed in the through hole in engagement with the valve seats, to an open position wherein the pair of spring loaded discs are disposed at least partially in the chamber such that the through hole is not blocked by the pair of spring loaded discs.

12. The method of claim 11, further comprising:
   securing a bonnet to the top of the valve body and a yoke coupled to the bonnet, wherein the valve stem is threadably engaged with the yoke, and is moveable along the second axis in response to a rotation of the valve stem.

13. The method of claim 12, further comprising positioning a pressure seal disposed in the chamber underneath the bonnet, wherein the pressure seal engages the valve stem.

14. A valve body comprising:
   a one piece block forged body comprising opposite ends, opposite sides, a top and a bottom, the block forged body further comprising:

a through hole having a first minimum diameter and extending along a first axis between the opposite ends, wherein the through hole defines a flow passageway;

a chamber having a second minimum diameter and extending from the top along a second axis, wherein the first and second axes are orthogonal, and wherein the chamber comprises a bottom defined by a floor separating the chamber from the through hole;

a passageway extending through the floor between the chamber and the through hole, wherein the floor comprises a pair of semi-circular shelf portions overlying the through hole; and a first pair of annular shoulders, each annular shoulder of the first pair of annular shoulders having a third minimum diameter and extending along the first axis under each of the shelf portions, wherein each annular shoulder of the first pair of annular shoulders has a first depth defined under the shelf portion along the first axis, and wherein the first pair of annular shoulders are coaxial with the through hole; and a valve seat disposed in each annular shoulder of the first pair of annular shoulders, wherein each of the valve seats has a second depth, wherein the second depth is between 100 and 135% of the first depth, and wherein the valve seats each have a front side facing each other and a backside facing away from each other, wherein each valve seat is not moveable along the first axis, and the backside of each valve seat is fixed to at least part of a respective annular shoulder of the first pair of annular shoulders.

15. The valve body of claim 14, wherein the backside of each valve seat is welded to the respective annular shoulder of the first pair of annular shoulders.

16. The valve body of claim 15, further comprising a second pair of annular shoulders, each annular shoulder of the second pair of annular shoulders being disposed outboard of the first pair of annular shoulders, wherein each annular shoulder of the second pair of annular shoulders has a fourth minimum diameter and extends along the first axis, wherein the first and second pair of annular shoulders are coaxial and wherein the fourth minimum diameter is less than the third minimum diameter, and wherein the backside of each valve seat is welded to the valve body along the respective annular shoulder of the pair of second annular shoulders.

17. The valve body of claim 14, wherein the passageway has a rectangular shape.

18. The valve body of claim 17, wherein the rectangular shape has rounded corners.

19. The valve body of claim 14, wherein the front side of each of the valve seats comprises a hard sealing surface.

20. The valve body of claim 14, further comprising a cavity in alignment with the passageway and chamber along the second axis on an opposite side of the through hole.

21. A valve comprising the valve body of claim 14, and further comprising a valve stem disposed in the chamber and extending along the second axis, wherein a pair of spring loaded discs are coupled to an end of the valve stem, wherein the pair of spring loaded discs are moveable along the second axis from a closed position wherein the pair of spring loaded discs are disposed in the through hole in engagement with the valve seats to an open position wherein the pair of spring loaded discs are disposed at least partially in the chamber such that the through hole is not blocked by the pair of spring loaded discs.

22. The valve of claim 21, further comprising a bonnet coupled to the top of the valve body and a yoke coupled to the bonnet, wherein the valve stem is threadably engaged with the yoke, and wherein the valve stem and the pair of spring loaded discs are moveable along the second axis in response to a rotation of the valve stem.

23. The valve of claim 22, further comprising a pressure seal disposed in the chamber underneath the bonnet, wherein the pressure seal engages the valve stem.

\* \* \* \* \*